US006206612B1

(12) United States Patent
Meyer

(10) Patent No.: US 6,206,612 B1
(45) Date of Patent: Mar. 27, 2001

(54) APPARATUS FOR PREVENTING CONTAMINATION OF A FRESH WATER SOURCE BY GREY WATER TO BE LAND APPLIED

(76) Inventor: Tim Meyer, Rte. 1, Box 17, Texhoma, OK (US) 73949

( * ) Notice: Subject to any disclaimer, the term of this patent is extended or adjusted under 35 U.S.C. 154(b) by 0 days.

(21) Appl. No.: 09/271,794

(22) Filed: Mar. 18, 1999

(51) Int. Cl.$^7$ .................................................. E02B 11/00
(52) U.S. Cl. ................................. 405/36; 405/52; 137/3; 137/236.1; 210/170
(58) Field of Search .......................... 405/36, 52; 137/3, 137/236.1, 263, 571, 896; 210/170, 172, 190, 191

(56) References Cited

U.S. PATENT DOCUMENTS

| | | |
|---|---|---|
| 3,872,981 | 3/1975 | Hedlund . |
| 3,995,436 | 12/1976 | Diggs . |
| 3,995,734 | 12/1976 | Berg, Jr. . |
| 4,077,509 | 3/1978 | Berg, Jr. . |
| 4,112,972 | 9/1978 | Lajeuness . |
| 4,115,879 * | 9/1978 | Toms ......................................... 4/318 |
| 4,162,218 * | 7/1979 | McCormick .......................... 210/104 |
| 4,171,775 | 10/1979 | Unruh . |
| 4,432,498 | 2/1984 | Clements . |
| 4,543,990 | 10/1985 | Meuleman . |
| 4,964,422 | 10/1990 | Ball et al. . |
| 5,056,557 | 10/1991 | Tervo . |
| 5,059,330 * | 10/1991 | Burkhardt ............................ 210/744 |
| 5,106,493 * | 4/1992 | McIntosh ............................. 210/100 |
| 5,192,426 * | 3/1993 | DeCoster et al. ..................... 240/117 |
| 5,217,323 | 6/1993 | Bilson . |
| 5,227,067 * | 7/1993 | Runyon ................................. 210/606 |
| 5,243,719 * | 9/1993 | McDonald et al. ....................... 4/665 |
| 5,251,346 * | 10/1993 | Donati ..................................... 4/665 |
| 5,403,498 * | 4/1995 | Morrissey et al. .................... 210/767 |
| 5,498,330 * | 3/1996 | Delle Cave .......................... 210/103 |
| 5,640,991 | 6/1997 | King . |
| 5,759,286 | 6/1998 | Sarver . |
| 5,759,387 * | 6/1998 | Wilkes ................................ 210/139 |
| 5,845,346 * | 12/1998 | Johnson, Jr. ............................. 4/665 |
| 5,868,937 * | 2/1999 | Back et al. ........................... 210/651 |
| 5,937,455 * | 8/1999 | Donati ..................................... 4/665 |
| 6,068,773 * | 5/2000 | Sheaffer ............................... 210/605 |

* cited by examiner

Primary Examiner—Eileen D. Lillis
Assistant Examiner—Gary S. Hartmann
(74) Attorney, Agent, or Firm—Edward L. White

(57) ABSTRACT

An apparatus for preventing the contamination of a fresh water source by grey water to be land applied, the apparatus comprising a source of grey water, a source of fresh water, a mixing tank having inlets for fresh and grey water as well as outlets for mixed fresh/grey water, and a safety overflow to prevent contamination of the fresh water source by grey water. There is a total disconnect between fresh water and grey water. Also provided is a means for preparing a desired mixture of fresh and grey water to be land applied, having desired characteristics of concentration of nitrogen, phosphorous, and other nutrients. A means for automatically transferring grey water from a lagoon or holding pond to an additional tank when the level of the grey water in the lagoon or holding pond exceeds a desired level is provided. Finally, the invention allows injection of additional nutrients, herbicides, pesticides and the like into the mixture to produce a desired composition for land application.

11 Claims, 4 Drawing Sheets

APPARATUS FOR PREVENTING CONTAMINATION OF A FRESH WATER SOURCE BY GREY WATER TO BE LAND APPLIED

CROSS REFERENCES TO RELATED APPLICATIONS

None.

BACKGROUND OF THE INVENTION a. Field of the Invention

The field of the invention is related to handling of livestock manure and urine. In particular, the invention relates to the land application of livestock waste. More particularly, the invention relates to devices to prevent contamination of a fresh water supply by inadvertent flow of livestock waste into a fresh water supply. Also, the invention relates to the land application of fertilizer, pesticides, herbicide, and other materials, commonly referred to as chemigation, by adding those compounds to water which is sprayed onto the growing crops.

b. Description of the Prior Art

The problem of how to deal with livestock waste has been with us as long as man has raised livestock. In traditional agriculture, where the animals were allowed to range free on open fields, disposal of waste was not a significant problem because the waste material was spread over the land upon which the animals grazed and roamed. However, as modem agriculture has dictated a transformation from open range raising of livestock to confined animal feeding operations, also called "CAFOs," the problem has become more acute. A confined animal feeding operation is a facility for animals, such as cattle, swine, poultry, and the like, which are housed in great numbers and raised according to a strict program. These concentrated animal feeding operations usually, but not always, confine the animals within a barn-like structure.

Where the animals in question are contained in a barn-like structure, the manure may be managed in two distinct ways. First, the manure may be managed on a "dry" basis. Dry manure management amounts to waiting until a sufficient build up of solid wastes accumulates on the floor of the barn-like structure, then collecting the solid waste, usually with a front end loader or the like, and dealing with it as a dry substance, usually by land application of the dry manure. The second way that waste products may be dealt with is a "wet" waste management system. An example of a wet management system is illustrated by the typical swine raising facility where the floor of the barn-like structure consists of a slatted concrete which allows waste material to fall through into pits located below the floor. The pits typically contain fresh water which receives the solid waste and urine. The pits are then periodically drained into a lagoon or holding pond adjacent to the barn-like structure. Once the contaminated water has been emptied into the lagoon or holding pond, it either evaporates or is land applied. From this point on the waste in question may be referred to generally by the term "grey water." While the waste is expected to consist generally of animal waste, it is possible that various agricultural chemicals, cleaning solutions, and even human waste may be contained therein. Further, the device is not limited to application to animal waste, but could also be used for disposal of human waste.

There has been much organized opposition to concentrated animal feeding operations. The reasons for this opposition are many, but included within the reasons are concerns about contamination of fresh water sources. The concerns regarding contamination of fresh water sources stem from two potential causes: first, the possibility that grey water may leach through the bottom of the lagoon or holding pond into underground water supplies; and second, that in pumping grey water to be land applied, and mixing it with fresh water, a back flow condition will occur where the grey water is pumped into the source of the fresh water. The concerns in question are illustrated by FIG. 4 and FIG. 5. FIG.4 illustrates the desired situation and the potential problem. Grey water and freshwater mix at point A and flow onward to be land applied. However, if there is an obstruction in the outlet flow line, or if the fresh water is not flowing for some reason, grey water may flow into the fresh water line as illustrated in FIG. 5. At that point, grey water may back flow into the fresh water source, such as an underground aquifer, a lake, or a stream. The problem is a result of the fact that at point A the piping for the fresh water and the grey water come together, presenting the possibility that grey water may flow back through the fresh water lines into the fresh water source.

Numerous solutions have been proposed to remedy this potential problem. One solution has been to install a check valve in the fresh water line. The check valve is intended to allow flow in only one direction, i.e., from the fresh water source through point A to be land applied. However, it is well known in literature, that check valves often malfunction. This is true because a defective check valve presents no problem for the operation. An operator can continue to use his system even though a check valve contained therein may be completely unoperational. There is no outward indication that the check valve does not work so the operator does not know that the valve has malfunctioned and needs to be replaced. Therefore, it is a widely held belief that check valves should be used only as a last line of defense, not relied upon primarily to prevent back flow problems such as the one in question.

Other systems rely on electronic sensors to determine whether a back flow condition may exist, and to shut off and to close down the fresh water line if such a condition exists. These electronic systems may operate on a number of principles, but the basic concept is the same: if a condition exists which may allow grey water to back flow in a fresh water line, the system is shut down. These electronic systems, however, have one of the same basic problems presented by the check valve system, namely, a malfunction in these systems does not affect the operation of the overall apparatus. An operator has no way of knowing when the sensors involved in the electronic system may have malfunctioned. A break down in the electronic sensing system does not become apparent until an emergency exists. At that point, it may be too late to stop the damage.

Therefore, it is desirable to have an invention which overcomes the obvious deficiencies of the prior art.

SUMMARY OF THE INVENTION

It is therefore an object of the invention to provide an apparatus for preventing the contamination of a fresh water source by grey water to be land applied. It is a further object of the invention to provide a means for preparing a desired mixture of fresh and grey water to be land applied, having desirable characteristics of concentration of nitrogen, phosphorous, and other like nutrients. It is also an object of the invention to provide a means for preparing a desired mixture, including herbicides, pesticides, fertilizer, and the like, in desired proportions to be land applied. It is finally an objection of the invention to provide a means for automatically transferring grey water from a lagoon or holding pond to an additional tank when the level of the grey water in the lagoon or holding pond exceeds a desired level.

There has thus been outlined, rather broadly, the more important features of the invention in order that the detailed description thereof that follows may be better understood, and in order that the contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which the disclosure is based, may readily be utilized as a basis for the designing of other structures, methods, and systems for carrying out the several purposes of the present invention. Additional benefits and advantages of the present invention will become apparent to those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U. S. Patent and Trademark Office and the public, generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application which is measured by both claims, nor is it intended to be limiting as to the scope of the invention in any way.

DESCRIPTION OF PREFERRED EMBODIMENTS

Figure 1:
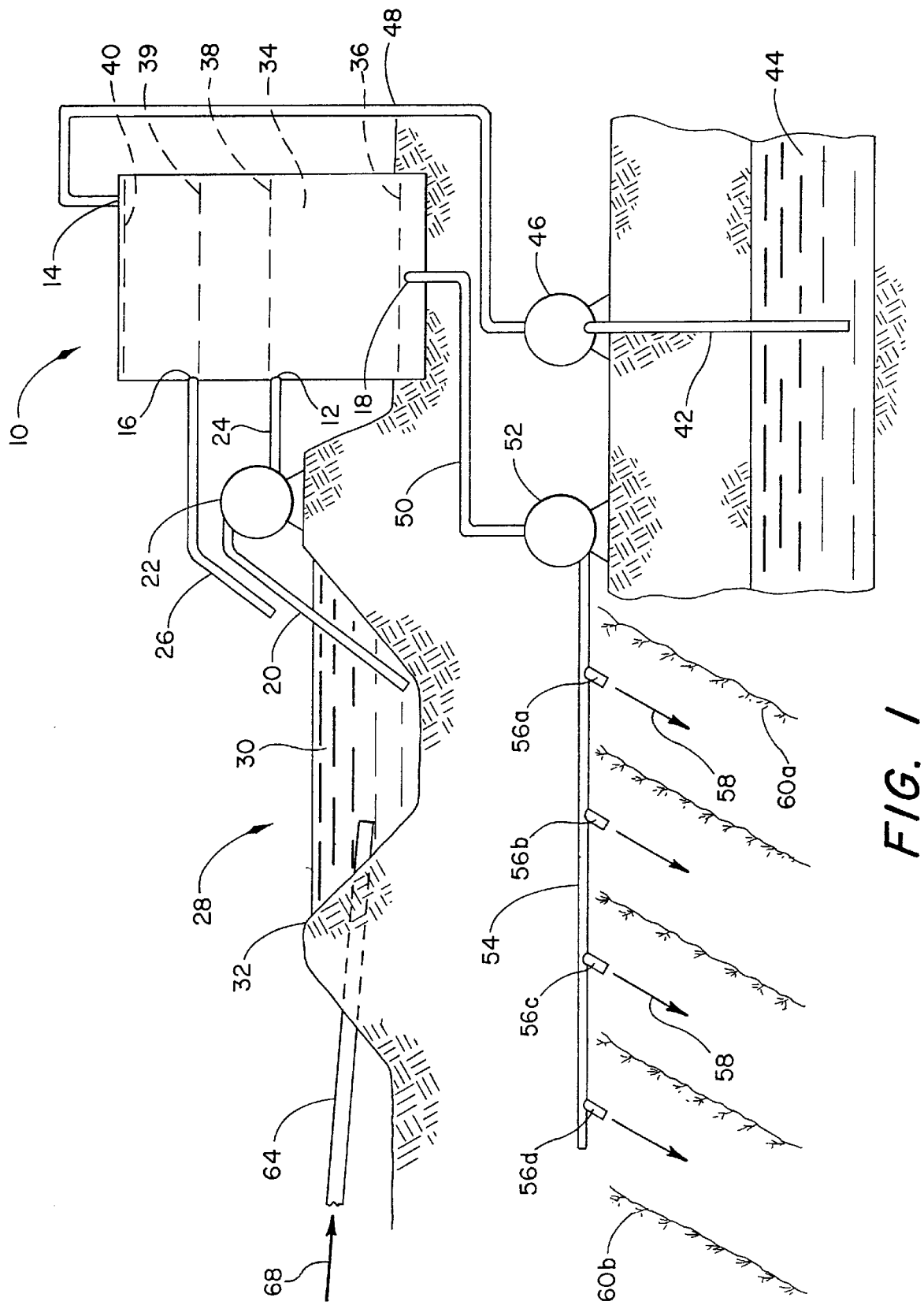
FIG. 1 is a schematic representation of the invention.

FIG. 1 illustrates how the invention operates in cooperation with a system for storage, treatment, and land application of grey water. The heart of the invention is the mix tank 10. Fresh water flows into the mix tank 10 through a fresh water inlet 14 via a second fresh water pipe 48. The fresh water inlet 14 defines a fourth tank level 40. Grey or waste water flows into the mix tank 10 through a waste inlet 12 via a second waste pipe 24. The level of the waste inlet 12 defines a second tank level 38. It is anticipated that the amount of mixture 34 typically kept in the mix tank 10 will be such that the level of the mixture 34 in the mix tank 10 remains lower than the second tank level 38. If the level of the mixture 34 in the mix tank 10 is allowed to rise above the second tank level 38, the potential arises for a syphoning effect to occur, where the mixture 34 is drawn backwards through the second waste pipe 24 into the lagoon 28. A valve, not shown, may be provided in the second waste pipe 24 so that this condition can be prevented. When the fresh and grey water flows into the mix tank 10 they form a mixture 34. The mixture 34 exits the mix tank 10 through a mixture outlet 18 via a first mixture pipe 50. The mixture outlet 18 defines a first tank level 36. The same potential problem, with respect to the back flow of the mixture 34 into the lagoon 28, exists with respect to flowing of the mixture 34 out of the mix tank 10 through the mixture outlet 18. Therefore, a valve, not shown, should be disposed somewhere along the first mixture pipe 50. The valve would prevent flow out of the mix tank 10 through the first mixture pipe 50 unless the valve were opened to allow land application. If the mix tank 10 becomes too full with mixture 34, then mixture 34 exits the mix tank 10 through overflow outlets 16 via an overflow pipe 26, and returns to a lagoon 28 from which it came. Preferably, the mix tank 10 has an open top at fourth tank level 40. The open top provides even further security that mixture 34 would not back flow into the second fresh water pipe 48. Rather, the mixture 34 would overflow through the open top and run onto the ground adjacent to the mix tank 10. In the embodiment where the tank has an open top, the mix tank 10 is preferably is surrounded by dykes which redirect any overflow to a holding facility (not shown). Preferably, the mix tank 10 will sit at a level which is at least as high as the highest expected level of grey water 30 in a lagoon 28. This would prevent inadvertent syphoning of grey water into the mix tank 10. Also, placing the mix tank 10 on a level at least as high as the highest expected level of the lagoon 28, allows the overflow dykes (not shown) to redirect any overflow water immediately back into the lagoon 28 where the mix tank 10 is situated directly adjacent to the lagoon 28. Also, where the mix tank top is open it will be preferable to have a mesh, net, or screen covering over the open top of the mix tank 10 to prevent solid matter such as dust, leaves, and the like, as well as animals from getting into the mix tank 10. The materials of construction of the mix tank 10 are not critical to the invention. It is well known to construct tanks from steel, plastic, concrete, and the like. Alternatively, the mix tank 10 could be of the same type construction material as the lagoon 28. Lagoons of this type are typically constructed of earthen embankments 32, with clay liners (not shown). Again, it is preferable the mix tank 10 be relatively higher than the lagoon 28. Where the mix tank 10 is higher than the lagoon 28, the safety overflow port 16 can simply allow any excess mixture to flow via gravity back to the lagoon 28 as directed by dykes (not shown). Where the mix tank 10 is at a lower level than the lagoon 28, or even at the same level, it may be required to pump the mixture 34 back to the lagoon 28 in the case of an overflow. This is undesirable, because it presents the same problem as noted in the prior art, namely that the system could fail causing contamination of the fresh water source. However, even where the mix tank 10 is lower than the lagoon 28, there should be no back flow so long as the second fresh water pipe 48 rises to a level higher than the fourth tank level 40. That is because gravity would not force the water up through that piping.

The overall operation of the invention is a part of the operations of a concentrated animal feeding operation as illustrated in FIG. 1. Grey water from livestock barns 68 flows (usually by gravity) through waste gravity lines 64 into the lagoon 28. There is a level of waste water 30 contained within the lagoon 28. The lagoon 28 is constructed of an earthen embankment 32 lined with clay (not shown). Waste water 30 from the lagoon 28 is drawn up through a first waste pipe 20 to a waste pump 22. The waste pump 22 pumps the waste water 30 through the second waste pipe 24 into the mix tank 10.

Fresh water is drawn from a fresh water source 44 through a fresh water pipe 42. It is pumped by a fresh water pump 46 through a second fresh water pipe 48 up and into the mix tank 10. Preferably, as shown, the second fresh water pipe 48 extends above the fourth tank level 40. It is still further preferable that the fresh water inlet 14 be slightly higher than the fourth tank level 40. This prevents any possibility that the mixture 34 could be siphoned out of the mix tank 10 back into the fresh water source 44.

It is desirable that an electronic means be provided for preparing a desired mixture 34 within the mix tank 10. The electronic means for providing a desired mixture would consist of mass or volume flow meters on the second waste pipe 24 and the second fresh water pipe 48. The calculation means, contained within the electronic means, would use the information provided by flow sensors to control the waste pump 22 and the fresh water pump 46 so as to provide the desired quantities of fresh water and grey water to prepare the desired mixture. Before any calculations can be done to determine the quantities of fresh and grey water required to make the desired mixture, analysis will have to be done of the grey water in the lagoon 28 to determine the content of the various nutrients at issue, particularly phosphorous, nitrogen, and potassium. Once these samples are taken, the numbers should be relatively stable over brief periods of time, such as a month. Thereafter, periodic sampling will allow a user to make calculations regarding proportions of fresh and grey water as needed to make the desired concentration of the various nutrients. It may also be advantageous to provide an injection pump to allow a user to add additional nutrients, if desired, as well as herbicides, pesticides, and other types of agricultural chemicals to the waste water for applications to the land. Again, a user knowing the needed concentration of the various chemicals and/or nutrients, and the composition of the grey water, could easily calculate the amount of chemicals needed to be added to the mix tank 10 to make up the desired solution. Though the means for adding additional nutrients and/or agricultural chemicals is not shown in the drawings, it would be rather simple, consisting of, at the very least, a feed tank, a metering pump, and a feed line to convey the materials from the tank to the mix tank 10. Devices are well known in the prior art for measuring flow rates in terms of either volume or mass. Similarly, devices for calculating total amounts of flow and for inputting desired values are well known, such as personal computers, logic controllers, and the like.

Once a desired mixture 34 is prepared, the mixture 34 exits the mix tank 10 through a mixture outlet 18 via the fist mixture pipe 50. From there it flows to the mixture pump 52 then into the second mixture pipe 54. The second mixture pipe 54 conveys the mixture to the land application means 56. As shown, the land application means 56a through 56d are simply nozzles in the second mixture pipe 54 which allow the mixture to escape onto growing crops 60. Preferably, the land application means would be a center-pivot irrigation system (not shown), or the like. There are a myriad types of devices for applying liquids to growing crops, and any of these methods could be utilized in this system. Once it has escaped through the nozzles 56a through 56d, the land applied mixture 58 absorbs into the ground and nourishes the growing crops 60a and 60b.

It is further preferable that an electronic means for sensing the level of mixture 34 in the mix tank 10 be provided. The electronic means for sensing the level of the mixture 34 could simply consist of a float-type device where the displacement of the float results in an electronic signal which can be converted into a corresponding height in the tank. Alternatively, the level detecting means could be a pressure transducer disposed near the bottom of the mix tank 10, the pressure on the transducer being directly related to the level of the mixture 34 within the mix tank 10. There are a wide variety of methods for measuring levels of liquids in tanks known in the prior art, and those methods are incorporated herein. If the level detecting means were to detect a mixture 34 level approaching the third tank level 39, an alarm could be displayed, alerting an operator that a potential overflow condition exists. The alarm could either be visual, i.e., a flashing light, or audio, i.e., a buzzer or the like. Means for annunciating an alarm are well known in the prior art, and said means are incorporated herein. Similarly, a level sensing means may be provided in the lagoon 28. Such a level sensing means would be of similar nature and construction as the level sensing means which may be provided in the mix tank 10. If a level sensing means in the lagoon 28 indicated that the level of grey water 30 in the lagoon 28 was approaching a maximum, an electronic signal could be sent from the level sensing means in the lagoon 28 to activate the waste pump 22. Thereby, waste water or grey water 30 would be removed from the lagoon 28 and pumped to the mix tank 10 to lower the level in the lagoon 28. The level sensing means in the lagoon 28 coupled with an electronic connection to activate the waste pump 22 provides an additional benefit for the system, in that it provides additional insurance against an overflow of grey water 30 from the lagoon 28.

OPERATION OF THE APPARATUS

Figure 2:
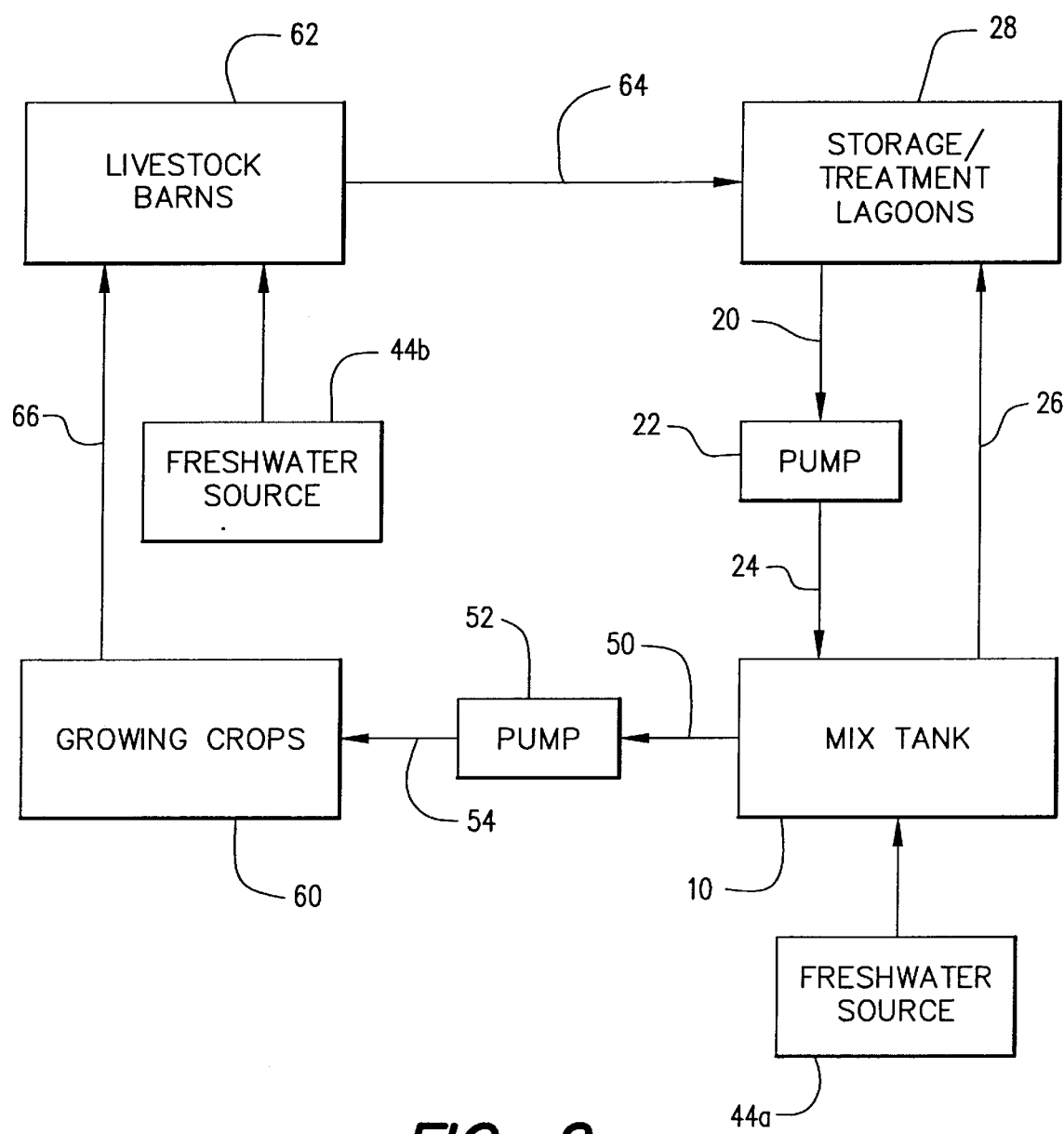
FIG. 2 is a flow-chart type representation of the present invention.
Figure 3:
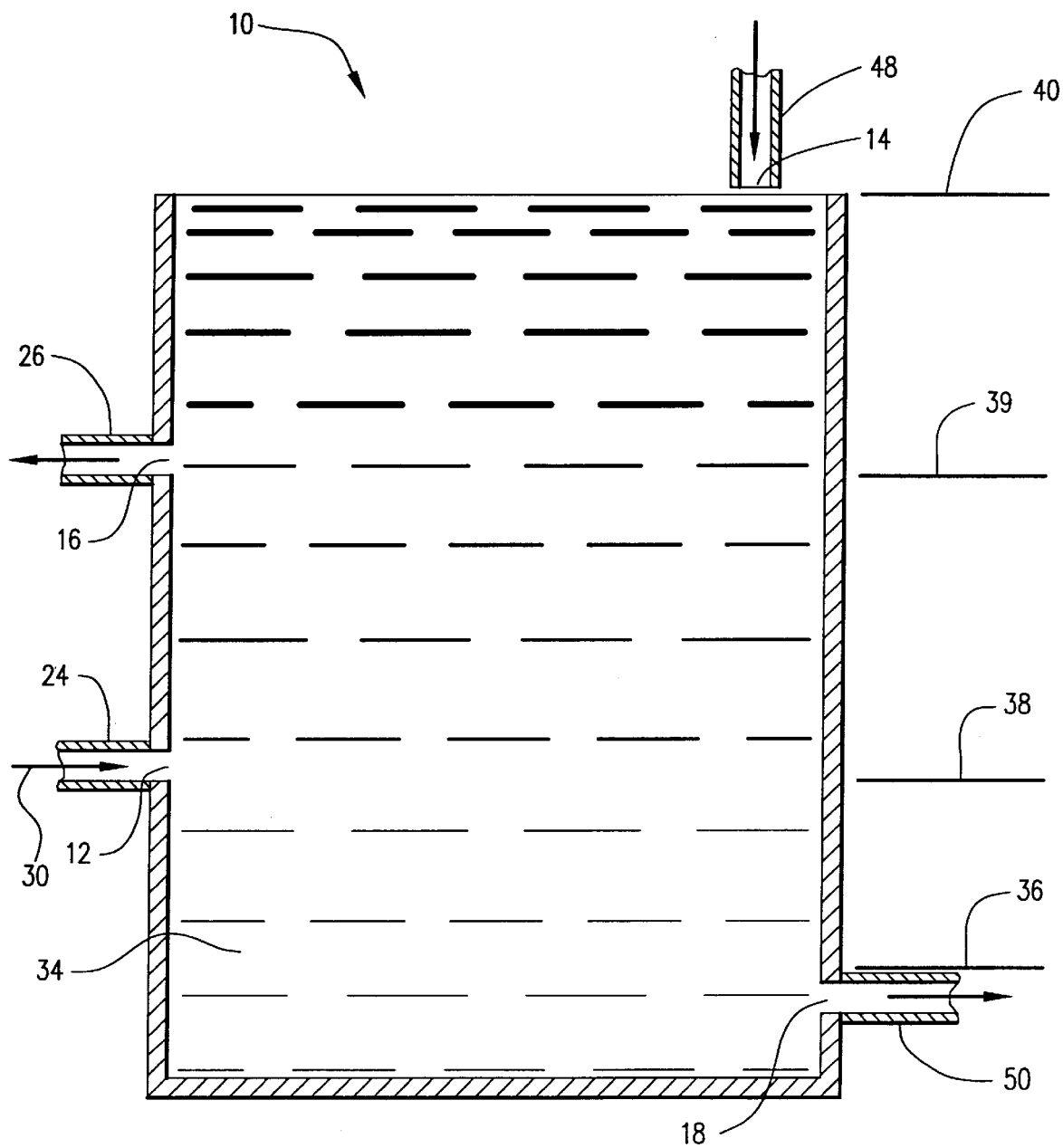
FIG. 3 is a detailed drawing of the mix tank.
Figure 5:
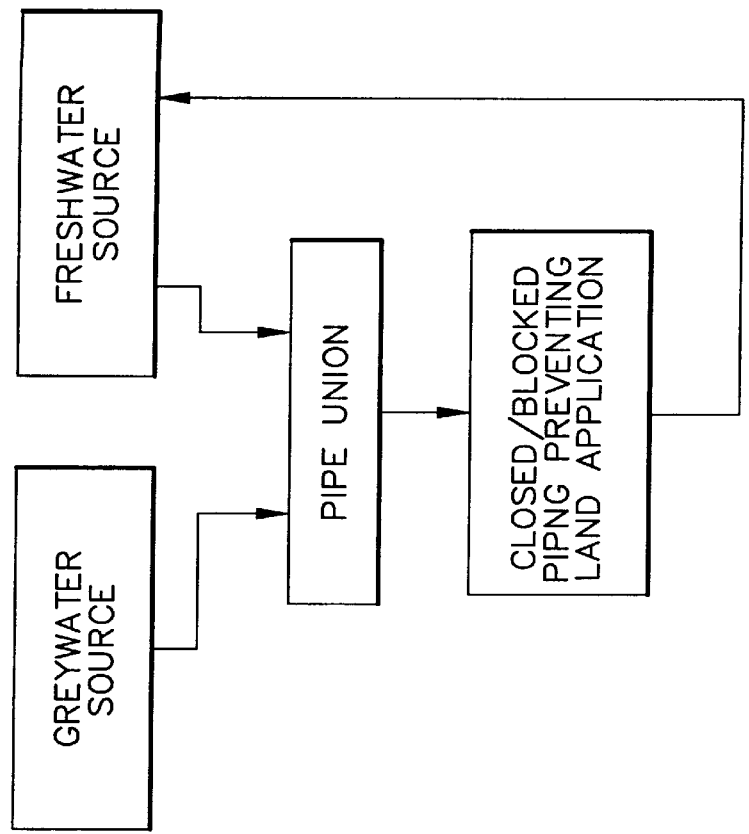
FIG. 5 is a block diagram which illustrates the problem with the prior art.
Figure 4:
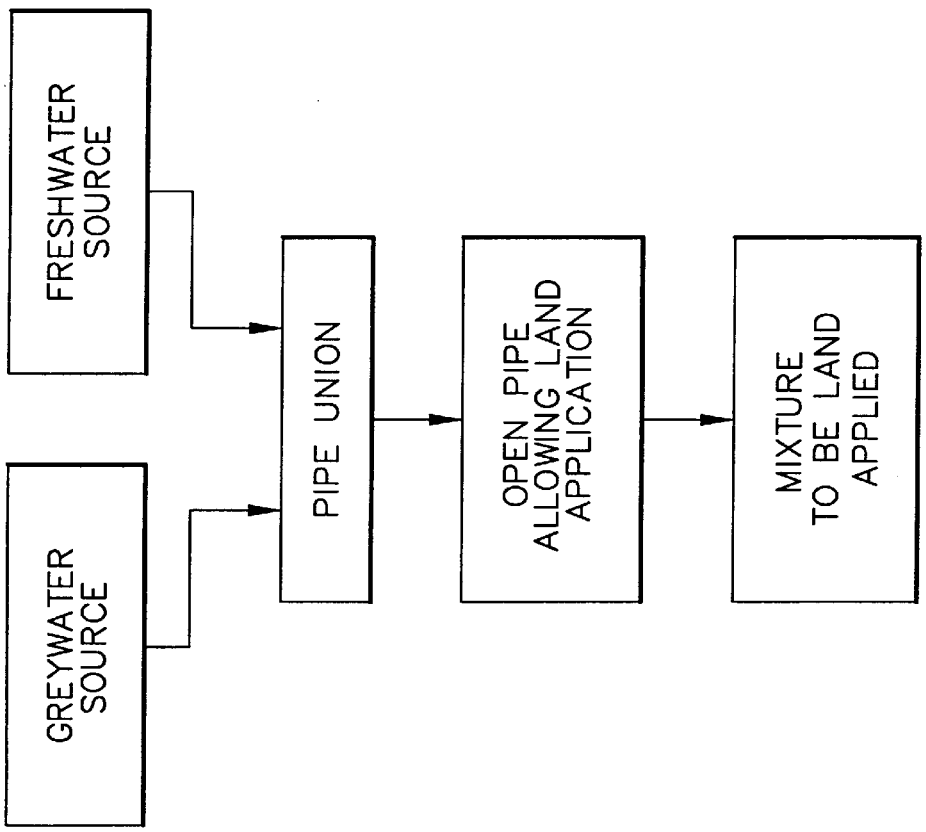
FIG. 4 is a block diagram which illustrates the desired operation of a prior art system.

FIG. 2 is a block flow diagram which shows the overall scheme of the system. In the upper left corner of FIG. 2, livestock in a confined animal feeding operation create animal waste which flows, generally under the influence of gravity, through waste gravity lines to the storage/treatment lagoons. From there the waste is pumped into a mix tank. Fresh water is also pumped into the mix tank through a fresh water inlet where it mixes with the waste water. The mixture is then pumped onto growing crops where the water and nutrients help the crops grow. The cycle would be completed by harvesting the growing crops, either grain or grasses 66. Those harvested products 66 can then be fed to the livestock restarting the cycle.

The mix tank acts to prevent waste water from flowing back into the fresh water source by inherently disconnecting the waste water lines from the fresh water lines. In the preferred embodiment, waste water flows into the mix tank at level 38. Fresh water flows into the mix tank 10 at tank level 40. Disposed between tank level 38 and tank level 40 is tank level 39 where an overflow pipe is situated. Should the level of the mixture rise to tank level 39, it flows through the overflow pipe back to the lagoon. Thus, it is prevented from ever entering the fresh water line 48. the top of the mix tank 10 is open, and the fresh water inlet 14 is situated above tank level 40, there is absolutely no way that waste water could ever flow backwards into the fresh water source. That is because if the level in the mix tank ever arose to tank level 40, it would overflow the sides of the mix tank before it could contact the fresh water inlet 14. There is no way this system can malfunction, as it is inherently safe. Unlike prior are systems, no equipment has to be maintained to prevent waste water from entering the fresh water lines. It is a physical impossibility.

Having thus described the invention, I claim:

1. An apparatus for protecting a fresh water source from grey water to be land applied, the apparatus comprising:
   a. a source of grey water;
   b. a source of fresh water;
   c. a mixing tank having at least:
      (1) a first inlet port for grey water;
      (2) a second inlet port for fresh water disposed relatively above the first inlet port;
      (3) a first outlet port for a mixture of grey and fresh water, disposed relatively below the first and second inlets;
      (4) a second outlet port which acts as a safety overflow to prevent the level in the tank from rising to the second inlet port, the second outlet disposed relatively above both the first inlet and the first outlet, but below the second inlet port;
   d. outlet means for conveying overflow from the second outlet port back to the grey water source; and
   e. land application means for land applying the contents of the mix tank to growing crops.

2. The apparatus of claim 1 where the overflow means is a gravity flow pipe which allows the overflow water to flow back to the source of grey water under the force of gravity.

3. The apparatus of claim 2 wherein the tank has an open top.

4. The apparatus of claim 3 where a measuring means detects the flow rates of grey and fresh water into the mix tank for the purpose of preparing a desired mixture for land application, and a data entry means for allowing a user to enter data specifying the desired mixture and a calculation means for determining the flow rates necessary to create the desired mixture.

5. The apparatus of claim 4 further comprising a grey water source level monitor means for automatically detecting when the level of the grey water source exceeds a desired level and transferring grey water to the mix tank when such a condition is detected.

6. The apparatus of claim 5 further comprising a means for injecting specified quantities of desired agricultural chemicals into the mix tank to produce a desired mixture for land application.

7. The apparatus of claim 1 where the outlet means for conveying overflow is pump-aided with an electronic means for activating the pump when an overflow condition is detected.

8. The apparatus of claim 7 where the tank has an open top.

9. The apparatus of claim 8 where a measuring means detects the flow rates of grey and fresh water into the mix tank for the purpose of preparing a desired mixture for land application, and a data entry means for allowing a user to enter data specifying the desired mixture and a calculation means for determining the flow rates necessary to create the desired mixture.

10. The apparatus of claim 9 further comprising a grey water source level monitor means for automatically detecting when the level of the grey water source exceeds a desired level and transferring grey water to the mix tank when such a condition is detected.

11. The apparatus of claim 10 further comprising a means for injecting specified quantities of desired agricultural chemicals into the mix tank to produce a desired mixture for land application.

* * * * *